United States Patent [19]

Tidwell

[11] Patent Number: 5,115,340
[45] Date of Patent: May 19, 1992

[54] HIGH AVERAGE POWER FARADAY ISOLATOR

[75] Inventor: Steve C. Tidwell, Woodinville, Wash.

[73] Assignee: Amoco Corporation, Chicago, Ill.

[21] Appl. No.: 519,258

[22] Filed: May 2, 1990

Related U.S. Application Data

[63] Continuation of Ser. No. 252,045, Sep. 30, 1988, abandoned.

[51] Int. Cl.$^5$ .............................................. G02F 1/09
[52] U.S. Cl. ..................... 359/484; 359/494; 359/497
[58] Field of Search ............... 350/375, 376, 377, 378, 350/381, 387; 335/304

[56] References Cited

U.S. PATENT DOCUMENTS

| | | | |
|---|---|---|---|
| 3,422,269 | 1/1969 | Chen | 350/378 |
| 3,436,545 | 4/1969 | Richards et al. | 350/376 |
| 3,513,457 | 5/1970 | Nelson | 350/376 |
| 3,523,718 | 8/1970 | Crow | 350/376 |
| 3,651,504 | 3/1972 | Goldberg et al. | 350/377 |
| 3,697,151 | 10/1972 | Skolnick et al. | 350/376 |
| 3,781,714 | 12/1973 | Schlossberg | 350/375 |
| 3,980,949 | 9/1976 | Feldtkeller | 350/376 |
| 4,284,329 | 8/1981 | Smith et al. | 350/375 |
| 4,379,620 | 4/1983 | Erickson | 350/387 |
| 4,398,798 | 8/1983 | Krawczak et al. | 350/375 |
| 4,549,155 | 10/1985 | Halbach | 335/304 |
| 4,612,500 | 9/1986 | Chen et al. | 350/376 |
| 4,613,811 | 9/1986 | Vaerewyck et al. | 350/377 |
| 4,731,581 | 3/1988 | Doriath et al. | 350/376 |
| 4,796,226 | 3/1989 | Valette | 350/375 |
| 4,816,796 | 3/1989 | Miyajima et al. | 335/304 |
| 4,818,080 | 4/1989 | Glasheen | 350/377 |

FOREIGN PATENT DOCUMENTS

| | | | |
|---|---|---|---|
| 0284439 | 9/1988 | European Pat. Off. | 335/304 |
| 59-114729 | 7/1984 | Japan | 335/304 |
| 1163431 | 7/1969 | United Kingdom . | |

OTHER PUBLICATIONS

"Microoptic Grating Multiplexers and Optical Isolators for Fiber Optic Communications", K. Kobayashi, IEEE *Journal of Quantum Electronics*, vol. QE-16, No. 1, Jan. 1980, pp. 11–20.

"Optical Isolator for Near Infrared", DeShazer and Maunders, *Review of Scientific Instruments*, vol. 38, No. 2, Feb. 1967, pp. 248–250.

"Simple, Compact, High-performance Permanent-magnet Faraday Isolator", *Optics Letters*, Oct. 1986, vol. 11, No. 10, pp. 623–625, Daniel J. Gauthier, Paul Narum and Robert W. Boyd.

"Temperature-stable Faraday rotator material and its use in high-performance optical isolators", Matsumoto and Suzuki, *Applied Optics*, vol. 25, No. 12, Jun. 15, 1986, pp. 1940–1945.

"5.4-Optical Isolators for High-Power 1.06-Micron Glass Laser Systems", Padula and Gilbert Young, *IEEE Journal of Quantum Electronics*, vol. QE-3, No. 11, Nov. 1967, pp. 493–498.

"Circulators for Optical Radar Systems", Fletcher & Weisman, *Applied Optics*, vol. 4, No, 7, Jul. 1965, pp. 867–873.

"Compact optical Isolator", F. J. Sansalone, *Applied Optics*, vol. 10, No. 10, Oct. 1971, pp. 2329–2331.

(List continued on next page.)

*Primary Examiner*—Bruce Y. Arnold
*Assistant Examiner*—Martin Lerner
*Attorney, Agent, or Firm*—Seed and Berry

[57] ABSTRACT

A reflective Faraday isolator for handling high average powers. The Faraday isolator includes a Faraday medium, one or more magnets, and pole pieces to concentrate the magnetic field produced by the magnet on the Faraday medium. The light energy is received at a first side of the Faraday medium, transmitted through the Faraday medium, and reflected by a mirrored opposing second side of the Faraday medium. The second side of the Faraday medium is attached to a heat removal means, whereby great amounts of heat energy may be removed, producing thermal gradients in the Faraday medium which are substantially parallel to an axis of the Faraday isolator. Various embodiments of the Faraday isolator of the present invention use different heat removal means.

17 Claims, 6 Drawing Sheets

OTHER PUBLICATIONS

"Compact faraday rotator for an Optical isolator using magnets arranged with alternating polarities", Shiraishi, Tajima and Kawakami, *Optics Letters*, vol. 11, No. 2, Feb. 1986, pp. 82–84.

"A Compact optical Isolator using a $Y_3Fe_5O_{12}$ crystal for near infra-red radiation", *Optical and Quantum Electronics*, 10 (1978), pp. 393–398.

"Optical isolators for high-power giant-pulse lasers", Eidmann, Sachsenmaier, Salzmann and Max-Planck, *Journal of Physics E: Scientific Instruments* 1972, vol. 5, pp. 56–58.

"Compact Optical Isolator For Near-Infrared Radiation", Iwamura & Katsui, *Electronics Letters*, vol. 13, No. 24, Nov. 24, 1977, pp. 721–722.

"Low-Loss Rotator and Application for Isolator Design", Meyer, Tanton, Mitra and Stettler, *Applied Physics*, 13 (1977) pp. 307–309.

"Semileaky thin-film optical isolator" Steven T. Kirsch, *J. Applied Physics*, 52(5), May 1981, pp. 3190–3199.

"Visible Optical Isolator using ZnSe", Wunderlich and DeShazer, *Applied Optics*, vol. 16, No. 6, Jun. 1977, pp. 1584–1587.

HIGH AVERAGE POWER FARADAY ISOLATOR

CROSS-REFERENCE TO RELATED APPLICATIONS

This application is a continuation of U.S. application Ser. No. 07/252,045 filed Sept. 30, 1988, now abandoned.

TECHNICAL FIELD

This invention relates to optical Faraday isolators, and more particularly, to optical Faraday isolators capable of handling high average power.

BACKGROUND OF THE INVENTION

Faraday isolators have long been used for the purpose of allowing a light beam to be transmitted in one direction with low loss while highly attenuating a beam traveling through it in the opposite direction. An important component of the optical isolator is a Faraday rotator, which exhibits the Faraday effect. The Faraday effect rotates the plane of polarization of linearly polarized light through an angle. The magnitude of the angle is dependent upon the length of the Faraday rotator and the magnitude of the magnetic field it imposes. Accordingly, to attain a predetermined angular rotation, with a fixed magnetic field, the length of the Faraday rotator must be appropriately adjusted. Since the Faraday effect is reversible, the light can be reflected back through the Faraday rotator after the first traversal, doubling the rotation of the polarization angle.

When dealing with relatively low energy optical beams, a Faraday rotator experiences a modest heating effect. This heating effect results in thermal gradients in the Faraday rotator, producing a "smearing" of the polarization angle rotation.

When a Faraday rotator is used with high optical powers (i.e., over 10 watts), the resulting degradation in optical beam quality due to Faraday rotator heating, becomes unacceptable.

In the past, Faraday rotators have been cooled. However, since most Faraday rotators are transmissive, the only cooling possible was that which could be accomplished by cooling the edges of the Faraday rotator. For two reasons this led to undesirable effects. One reason is that only a small percentage of the total area of a Faraday rotator is located on its edges. A second reason is that heat removal from the edges of a Faraday rotator still produces the undesirable thermal gradients in a transverse direction.

It is therefore desirable to have a Faraday isolator which is capable of handling high energy light beams without experiencing significant beam degradation due to heating effects.

SUMMARY OF THE INVENTION

It is an object of the present invention to provide a Faraday isolator which is capable of handling high energy light beams.

It is another object of the present invention to provide a Faraday isolator which is reflective.

It is yet another object of the present invention to provide a Faraday isolator which does not exhibit transverse heat gradients.

Still another object of the present invention is to provide a Faraday isolator having a heat removal rate which scales with its aperture area.

Yet another object of the present invention is to provide a Faraday isolator having substantially axial thermal gradients.

According to one aspect, the present invention is a reflective Faraday isolator comprising reflective Faraday rotator means having first and second sides. The Faraday rotator means receives optical energy at a first side from a first direction and reflects the optical energy from the first side in a second direction. The Faraday isolator means further comprises cooling means positioned adjacent to the second side of the Faraday rotator for absorbing heat energy from the reflective Faraday rotator.

DETAILED DESCRIPTION OF THE PREFERRED EMBODIMENT

Figure 1:
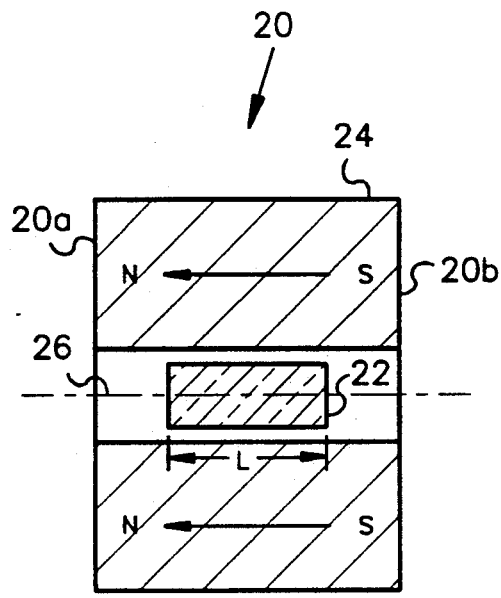
FIG. 1 is an axial cross-sectional view of a traditional design of a Faraday rotator, known in the prior art.

FIG. 1 is an axial cross-sectional view of a Faraday isolator 20 known in the prior art. The Faraday isolator 20 includes a Faraday medium 22 extending along an axis 26 of the isolator and an axially symmetric magnet 24. The Faraday medium can be any of a number of transmissive materials which exhibit the Faraday effect. Since Faraday media are effective for different wavelength intervals, it is necessary to choose an appropriate material depending upon the intended wavelength of the optical energy. Examples of Faraday media include terbium gallium garnet (TGG), zinc selenide (ZnSe), terbium doped glasses, cadmium manganese telluride (CdMnTe) and indium antimonide (InSb). Planar polarized light energy which is received by the Faraday isolator 20 at a first side 20a from a direction along the axis 26 is transmitted through the Faraday medium 22 to an opposite second side 20b of the Faraday isolator 20.

The angle of rotation of the polarization plane of the transmitted optical energy is proportional to the axial length L of the Faraday medium 22 and the strength of the magnetic field imposed upon the Faraday medium 22 by the magnet 24.

Figure 2:
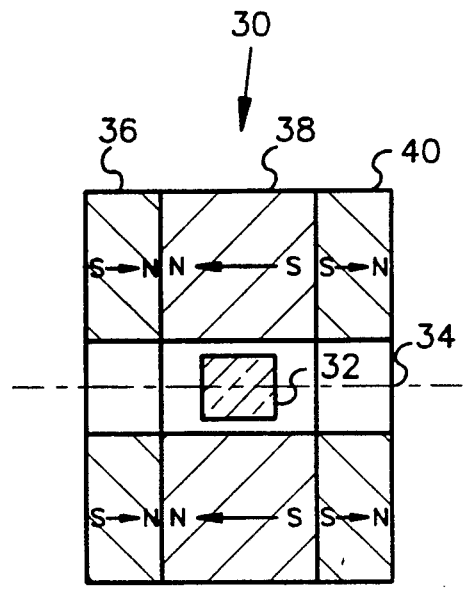
FIG. 2 is an axial cross-sectional view of an enhanced magnetic field design of a Faraday rotator known in the prior art.

Another transmissive Faraday isolator 30 known in the prior art is shown in FIG. 2. The Faraday isolator 30 includes a Faraday medium 32 disposed along an axis 34. In addition, the Faraday isolator includes three magnets 36, 38 and 40. Magnet 38 is transversely sandwiched between magnets 36 and 40. Magnets 36, 38, and 40 are symmetrically arranged with respect to the axis 34. The magnetic fields of the magnets 36, 38 and 40 are all parallel to the axis 34. However, the polarity of the magnetic field in magnet 38 is arranged opposite to the polarity of the magnetic fields in the magnets 36 and 40. As such, the magnetic field produced by the magnet 38 is contained by the magnets 36 and 40 and, therefore, further concentrated on the Faraday medium 32. Since the amount of Faraday rotation is proportional to the magnetic field strength imposed upon the Faraday medium 32, a given magnet 38 will, accordingly, produce a greater Faraday rotation than when used in the Faraday isolator 20 of FIG. 1. Alternatively, for a given desired Faraday rotation, the Faraday material 32 can be made thinner, thus lowering the absorbed light energy and the associated performance degradation due to heating.

Figure 3:
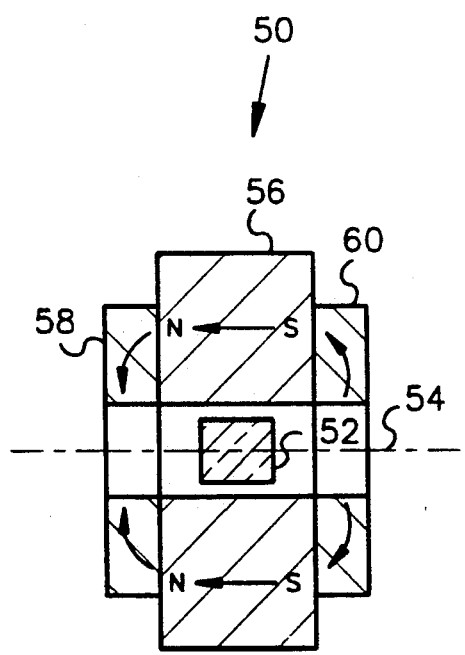
FIG. 3 is an axial cross-sectional view of a first transmissive Faraday rotator.

FIG. 3 is an axial cross-sectional view of a transmissive Faraday isolator 50 having a simpler design. A Faraday medium 52 is symmetrically disposed along an axis 54. A magnet 56 symmetrically surrounds the Faraday medium 52 and imposes its magnetic field on the Faraday medium. The Faraday isolator 50 further includes pole pieces 58 and 60. The pole pieces 58 and 60 symmetrically sandwich the magnet 56 and confine the magnetic field produced by the Faraday medium 52. Accordingly, the transmissive Faraday rotator 50 is simpler than the Faraday rotator 30 shown in FIG. 2 and more effective than the Faraday rotator 20 shown in FIG. 1.

Figure 4:
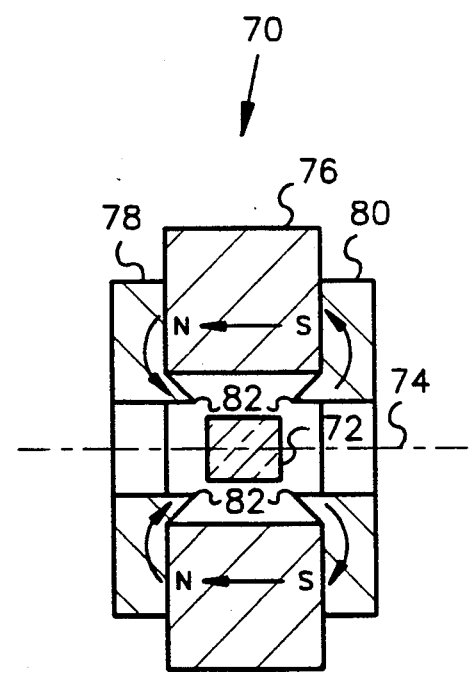
FIG. 4 is an axial cross-sectional view of a second transmissive Faraday rotator.

FIG. 4 is an axial cross-sectional view of another transmissive Faraday isolator 70. The Faraday isolator 70 includes a Faraday medium 72 located on an axis 74. The Faraday medium 72 is symmetrically surrounded by a magnet 76, which produces a magnetic field having a direction that is parallel to the axis 74. The Faraday isolator 70 further includes two pole pieces 78 and 80 which are adjacent to the magnet 76 and have projections 82 which extend generally axially toward the Faraday medium 72. These extensions concentrate the magnetic field of the magnet 76. Accordingly, the Faraday medium 72 can be made even thinner, resulting in better high power performance than that of the Faraday isolator 50 shown in FIG. 3.

Figure 5:
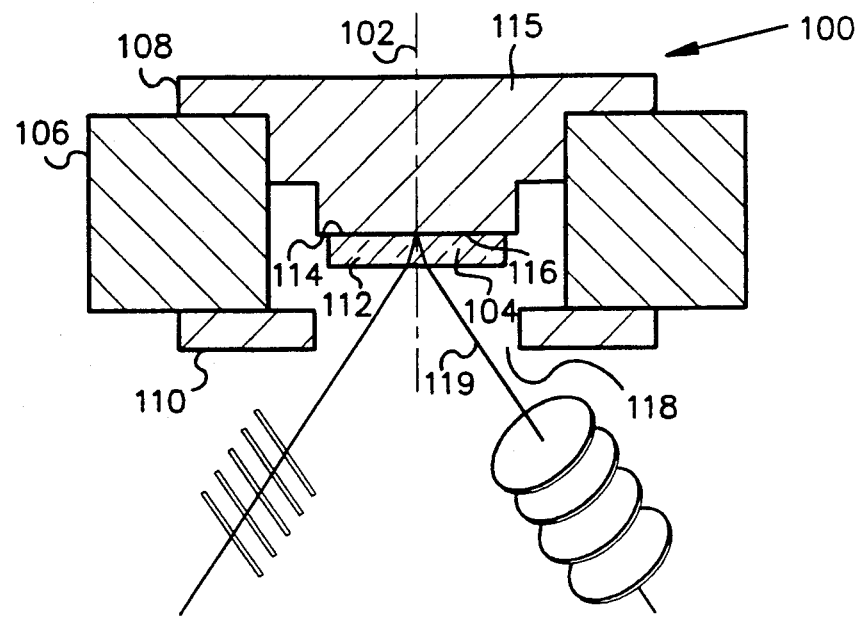
FIG. 5 is an axial cross-sectional view of a first embodiment of a reflective Faraday isolator embodying the present invention.

A transverse axial cross section of a first embodiment of a Faraday isolator 100 according to the present invention is shown in FIG. 5. The Faraday isolator 100 is arranged symmetrically about an axis 102, and includes a Faraday medium 104, a magnet 106, and pole pieces 108 and 110. The Faraday medium 104 has a first side 112 and an opposite second side 114. The first and second sides 112 and 114 are substantially planar and perpendicular to the axis 102. The Faraday medium 104 is supported by a portion 115 of the pole piece 108, which projects inwardly of the magnet 106 and terminates in a planar surface 116 to which the second side 114 of the Faraday medium 104 is attached. Either the second side 114 of the Faraday medium 104 or the pole surface 116 has a mirrored surface (not shown) for reflecting optical energy received through the first side 112 of the Faraday medium. The pole piece 110 is an open pole piece, having an aperture 118 disposed along the axis 102. A beam 119 of optical energy which reaches and is reflected by the mirrored surface passes inwardly through and outwardly through the aperture 118 in the pole piece 110. The configuration of the pole pieces 108 and 110 impose a substantially uniform and very strong magnetic field from the magnet 106 on the Faraday medium 104. Accordingly, the effect of the Faraday medium 104 on impinging light energy is substantially uniform in the transverse direction.

Since the Faraday isolator 100 is a reflective isolator, the axial thickness, T, of the Faraday medium 104, need only be half that of an equivalent transmissive Faraday isolator. Further, the Faraday isolator 100 is capable of handling significant amounts of optical energy, since the pole piece 108, which is adjacent and in thermal contact attached to the second side 114 of the Faraday medium 104, also serves as a heat sink for the Faraday medium. The presence of the pole piece 108 adjacent to the second side 114 of the Faraday medium 104 establishes a very uniform temperature across the second side 114. As a result, the thermal gradients in the Faraday medium 104 are substantially parallel to the axis 102 and, as a result, optical energy impinging upon the Faraday medium 104 is subjected to substantially the same rotation of polarization angle, regardless of where it strikes the Faraday medium 104.

Figure 6:
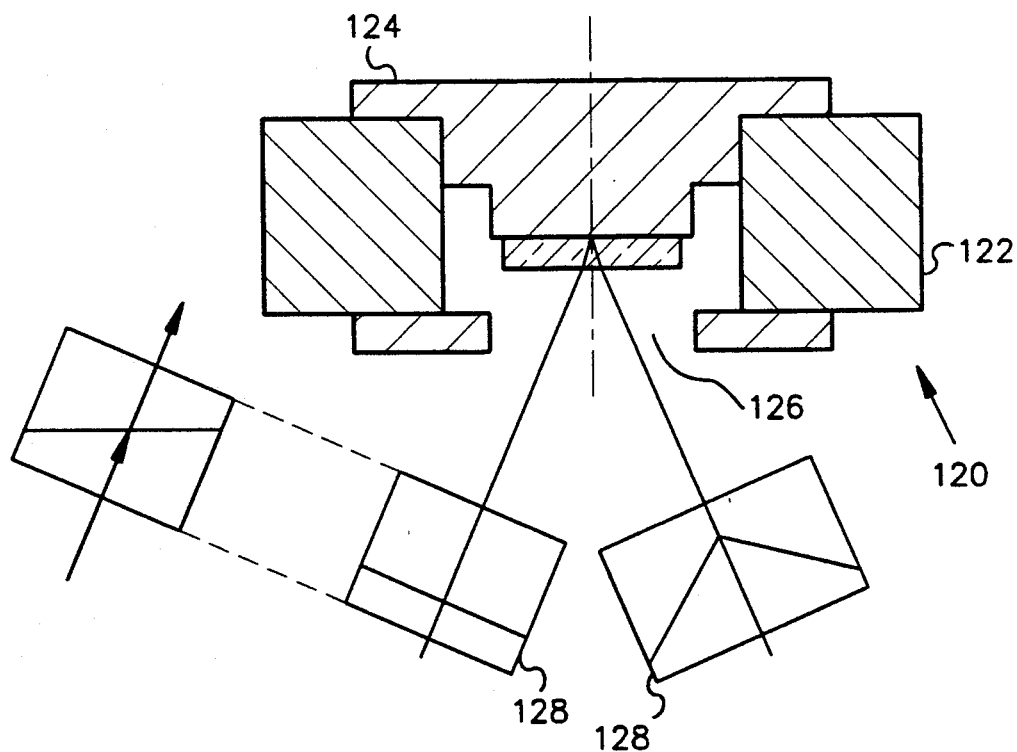
FIG. 6 is an axial cross-sectional view of a second embodiment of a reflective Faraday isolator embodying the present.

The Faraday isolator 120, shown in FIG. 6, differs from the Faraday isolator 100, shown in FIG. 5, in that the Faraday isolator 120 has a smaller magnet 122 and a smaller pole piece 124. Because of the smaller size of the magnet 122, the pole piece 124 does not have to project as far into the aperture 126 of the magnet 122. The Faraday rotator 120 is intended for use in low to medium power applications, where polarization of the fields can be accomplished by polarizing prisms 128.

Figure 7:
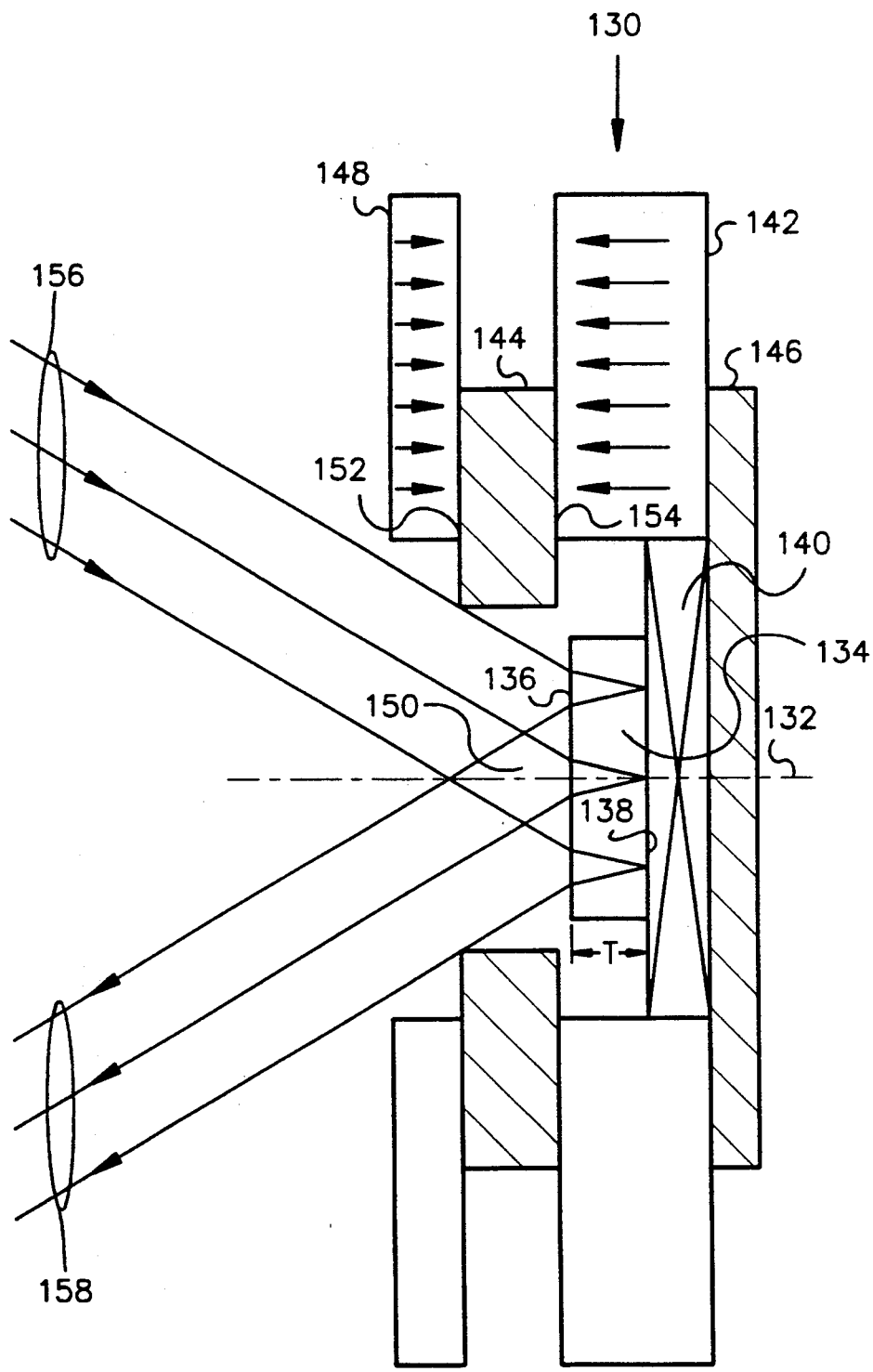
FIG. 7 is an axial cross-sectional view of a third embodiment of a reflective Faraday isolator embodying the present invention.

FIG. 7 is an axial cross-sectional view of a second embodiment of a Faraday isolator 130 according to the present invention. The Faraday isolator 130 is symmetric about an axis 132 and includes a Faraday medium 134. The Faraday medium 134 has a first side 136 and a second side 138. The second side 138 of the Faraday medium 134 is attached to a rear cooling jacket 140. The rear cooling jacket 140 is designed to remove heat from the Faraday medium 134 transmitted through its second side 138.

The Faraday isolator 130 also includes a main magnet 142, two pole pieces 144 and 146 arranged on opposite sides of the main magnet, and an optional guard magnet 148 positioned outward of the pole piece 144. The magnetic fields in the main magnet 142 and the optional guard magnet 148 are parallel to the axis 132, but antiparallel to one another. The pole piece 144 has an aperture 150 and axially symmetric surfaces 152 and 154. These surfaces mate with corresponding surfaces of the guard magnet 148 and the main magnet 142, respectively. The pole piece 144, therefore, concentrates the magnetic field produced by the main magnet 142, as does the rear pole piece 146. As a result, the magnetic field applied to the Faraday medium 134 is substantially parallel to the axis 132. Furthermore, because of the cooling capacity of the rear cooling jacket 140, the second side 138 of the Faraday medium 134 is substantially uniformly cooled and, accordingly, the thermal gradients in the Faraday medium 134 are substantially parallel to the axis 132.

An input light energy beam 156 passes through the aperture 150 of the pole piece 144 to the first side 136 of the Faraday medium 134. The input light energy 156 is refracted at the first side 136, but is transmitted through the Faraday medium 134 to the second side 138. In this first pass through the Faraday medium 134, the planar polarization of the input light energy 156 is rotated by a very uniform angle which depends upon the axial thickness T of the Faraday medium 134, the material from which the Faraday medium 134 is made, and the strength of the magnetic field produced by the main magnet 142 and, possibly, the guard magnet 148.

Following the reflection by the mirrored surface at the interface between the second side 138 of the Faraday medium 134 and the rear cooling jacket 140, the light energy passes outwardly through the Faraday medium to the first side 136, where it is refracted. Upon refraction, an output light energy beam 158 is produced. The planar polarization of the output light energy 158 has been rotated by a fixed angle with respect to the planar polarization of the input light energy 156. The angle 150 between the axis 132 and the direction of the input light energy 156 is limited by variations in the rotation of the angle of polarization caused by the Voight effect. The Voight effect influences polarization in the presence of transverse magnetic fields. In practical applications, the angle 150 will be constrained to roughly 10 degrees.

Figure 8:
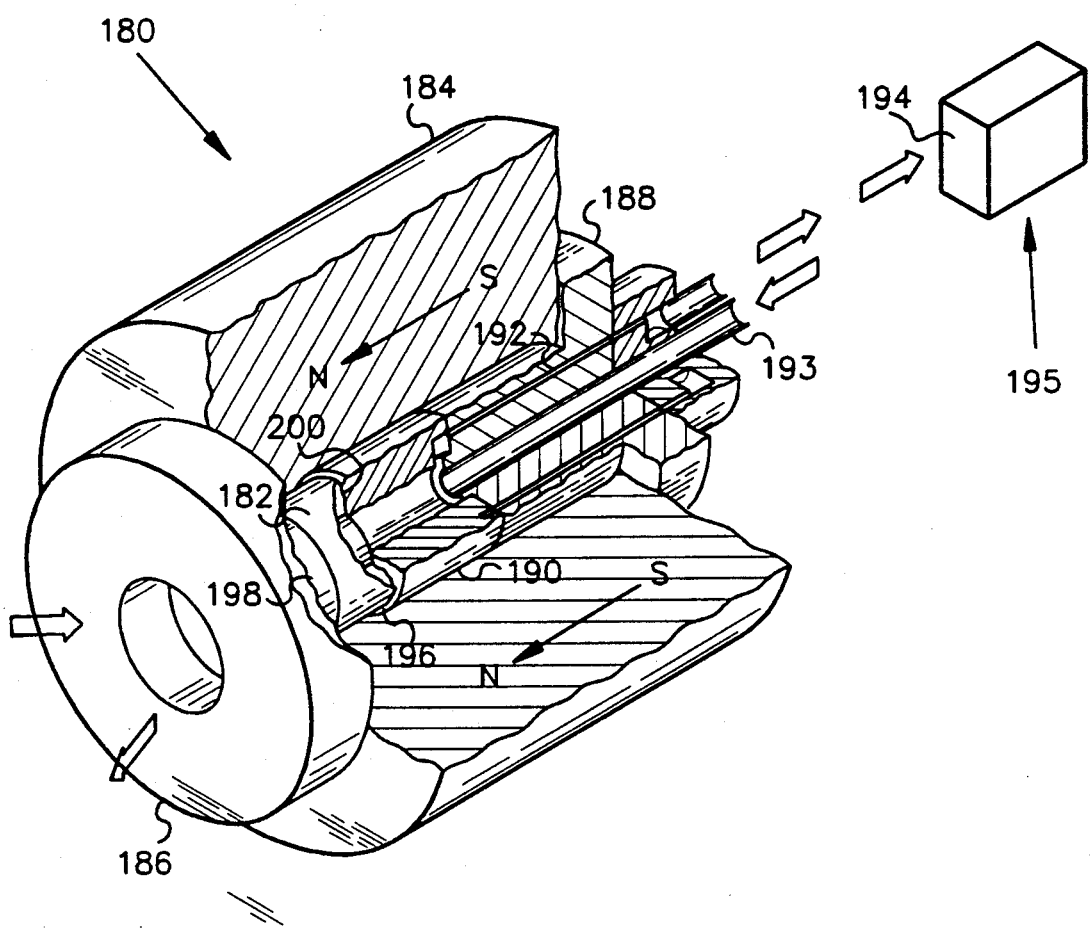
FIG. 8 is a cutaway isometric view of a fourth embodiment of a reflective Faraday isolator embodying the present invention.

An isometric cut away view of a third embodiment of a Faraday isolator 180 of the present invention is shown in FIG. 8. The Faraday isolator 180 includes a Faraday medium 182, an annular magnet 184 and two pole pieces 186 and 188. The pole piece 188 fits inwardly of the magnet 184 and supports a nonmagnetic cooling ring 190 within the magnet central aperture. The nonmagnetic cooling ring 190 can be made from a highly thermally conductive material containing cooling passages through which a cooling liquid is circulated. The cooling liquid is directed through the cooling passages 192 by conduits 193 leading to and from a cooling manifold 194 connected to a refrigerator system 195. As a result of its high thermal conductivity, the nonmagnetic cooling ring 190 achieves a substantially uniform temperature on a transverse circular end surface 196.

The Faraday medium 182 has first and second sides 198 and 200, respectively. The second side 200 or the cooling ring front surface 196 is a mirrored surface (not shown). The second side 200 is in thermal contact with the transverse circular end surface 196 of the nonmagnetic cooling ring 190, thereby achieving a significant cooling effect of the Faraday medium 182.

The Faraday medium 182 of the Faraday isolator 180 of FIG. 8 can be made from a terbium gallium garnet crystal. The magnet 184 can have a 15 kG field. Under these circumstances, the Faraday isolator 180 can isolate optical energy having an average power of 1 kW.

Figure 9:
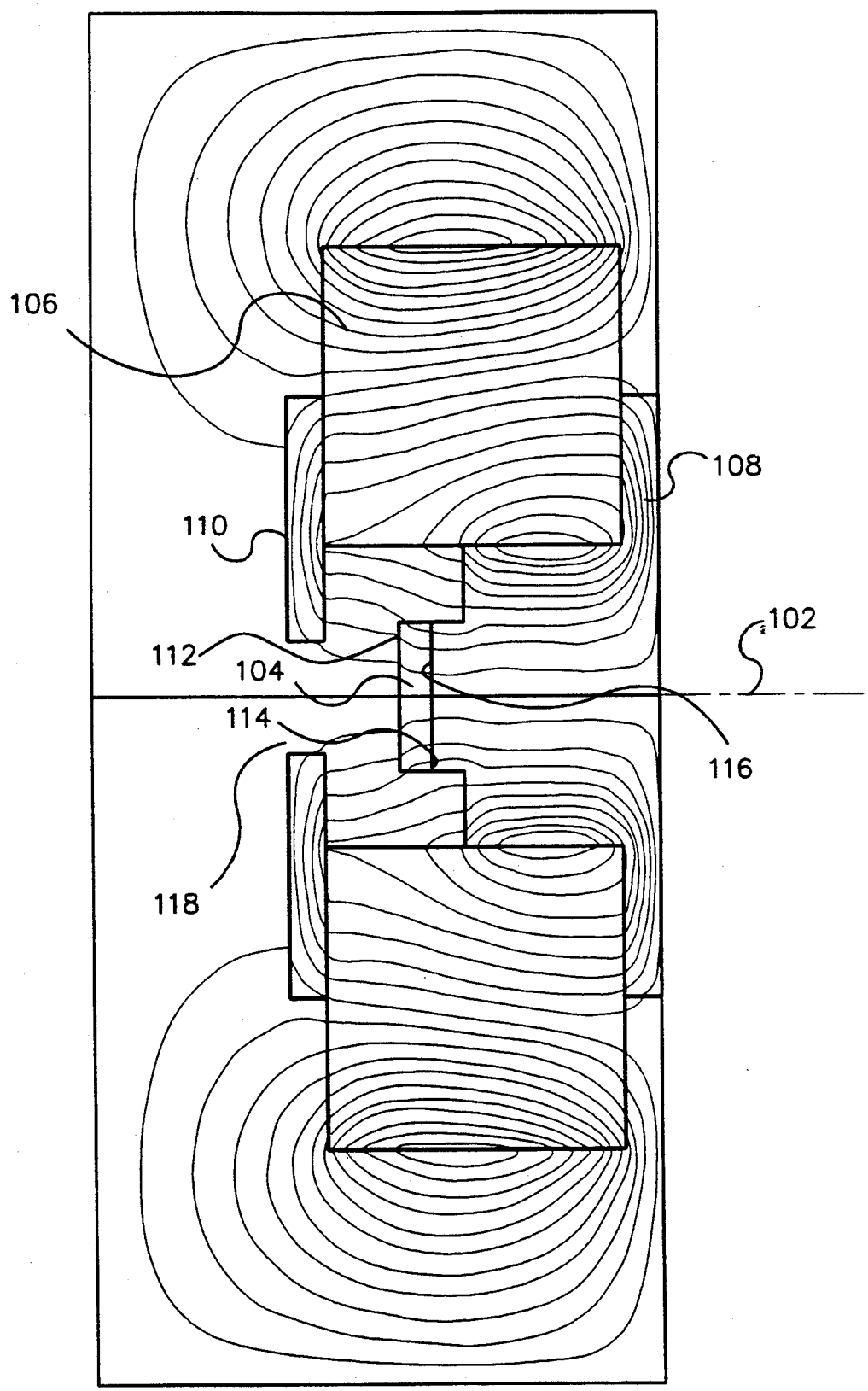
FIG. 9 is an axial cross-sectional view of the first embodiment of the invention shown in FIG. 3, showing the magnetic lines of force.

FIG. 9 is an axial cross-sectional view of the Faraday isolator 100 shown in FIG. 5 illustrating the uniformity of the magnetic fields in the Faraday medium 104 by showing the magnetic flux lines produced by the magnet 106, and confined by the pole pieces 108 and 110.

Figure 10:
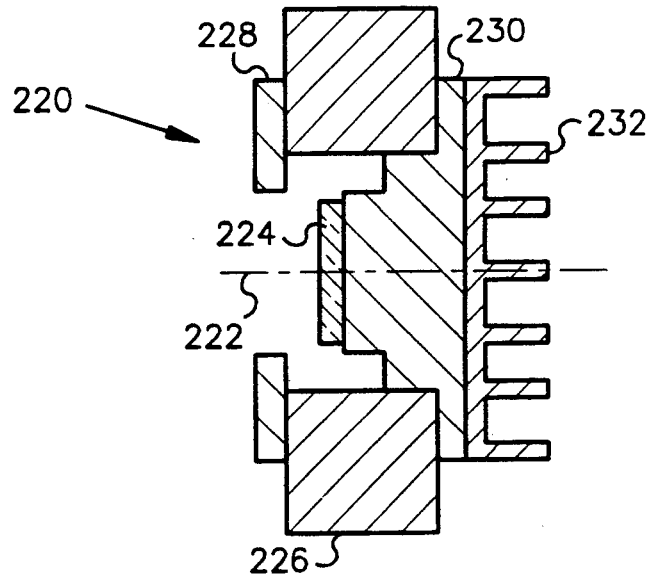
FIG. 10 is an axial cross-sectional view of a fifth embodiment of a reflective Faraday isolator embodying the present invention.

An axial cross-sectional view of a fifth embodiment of a Faraday isolator 220 of the present invention is shown in FIG. 10. The Faraday isolator 220 is symmetric about an axis 222, and includes a Faraday medium 224, a magnet 226, and pole pieces 228 and 230. The Faraday medium 224 is mounted on the pole piece 230, which extends axially inside the magnet 226, and conducts heat energy away from the Faraday medium 224 as previously described for the embodiment of FIG. 5. The heat energy conducted by the pole piece 230 is directed axially away from the Faraday isolator 220 to a heat sink 232 which is attached to a side of pole piece 230 opposite the side to which the Faraday isolator 224 is attached.

Figure 11:
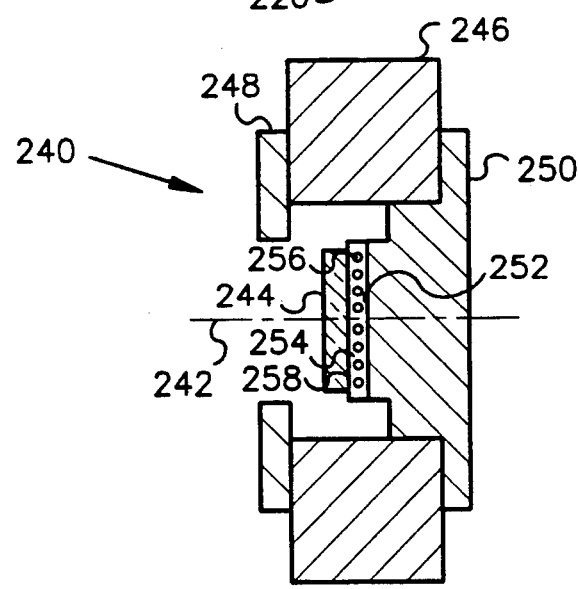
FIG. 11 is an axial cross-sectional view of a sixth embodiment of a reflective Faraday isolator embodying the present invention.

FIG. 11 is an axial cross-sectional view of a fifth embodiment of a Faraday isolator 240 of the present invention. The Faraday isolator 240 is symmetric about an axis 242. The Faraday isolator 240 includes a Faraday medium 244, a magnet 246, and two pole pieces 248 and 250. The pole piece 250 extends axially inward of the magnet 246, and has a transverse planar surface 252 located within the magnet 246. A copper cold plate 254 is attached to the transverse planar surface 252. The copper cold plate 254 contains a number of passages 256 intended for carrying cooling fluids. The copper cold plate 254 also has a transverse planar surface 258 to which the Faraday medium 244 is thermally attached. The heat absorbed by the Faraday medium 244 is thereby conducted to the copper cold plate 254 and then exchanged to the cooling fluids passing through the passages 256 for conducting away from the Faraday isolator 240.

Figure 12:
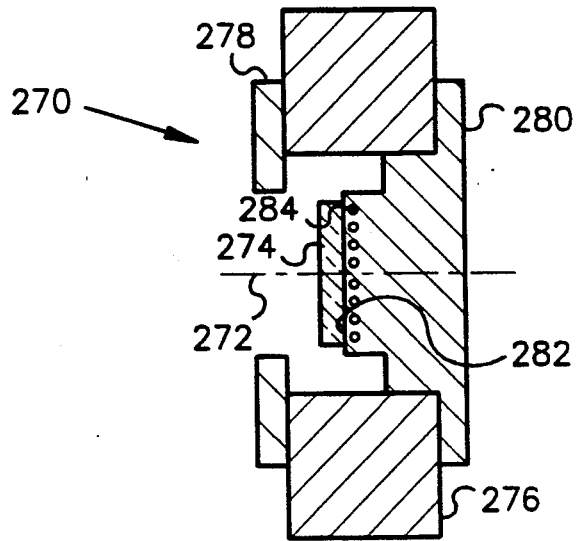
FIG. 12 is an axial cross-sectional view of a seventh embodiment of a reflective Faraday isolator embodying the present invention.

An axial cross-sectional view of a sixth embodiment of a Faraday isolator 270 of the present invention is shown in FIG. 12. The Faraday isolator 270 is axially symmetric with respect to an axis 272. The Faraday isolator 270 includes a Faraday medium 274, a magnet 276, and pole pieces 278 and 280. The pole piece 280 extends axially inward of the magnet 276 and has a transverse planar surface 282 located within the magnet 276. The Faraday medium 274 is attached to the pole piece 280 at the transverse planar surface 282. In close proximity to the transverse planar surface 282, the pole piece 280 contains a plurality of fluid passages 284 which can conduct a cooling fluid. In operation, the Faraday medium 274 of the Faraday isolator 270 absorbs heat from the light energy striking the Faraday medium 274. This heat is conducted through the transverse planar surface 282 of the pole piece 280 to the fluid passages 284, where it is transferred to the cooling fluid and conducted away from the Faraday isolator 270.

While the detailed description above has been expressed in terms of specific embodiments of the invention, those skilled in the art will appreciate that many other forms of the Faraday isolator could be used to accomplish the purposes of the disclosed inventive Faraday isolator. Accordingly, it can be appreciated that various modifications and applications of the above-described embodiments may be made without departing from the spirit and scope of the invention. Therefore, the present invention is to be limited only by the following claims.

I claim:

1. An apparatus comprising:
    polarization rotation means for 1) rotating the polarization of polarized incident optical energy in the presence of a substantially uniform magnetic field to produce a first optical energy with a polarization which is rotated through an angle with respect to the polarization of the polarized incident optical energy, 2) reflecting the first optical energy, and 3) further rotating the polarization of the reflected first optical energy in the presence of the magnetic field to product a second optical energy with a polarization which is further rotated through the angle with respect to the polarization of the first optical energy, the polarization rotation means producing a total rotation of the second optical energy relative to the incident optical energy greater than the angle, the polarization rotation means having a first side for receiving and transmitting incident optical energy, and a second side opposite the first side for reflecting the first optical energy;

magnet means positioned adjacent and coaxially along an axis with the polarization rotation means for producing a constant, substantially uniform magnetic field in a fixed direction in the polarization rotation means;

first and second pole pieces, positioned coaxially on the axis on opposite sides of the polarization rotation means and the magnet means, for substantially confining the magnetic field to the polarization rotation means; and cooling means coaxial with the polarization rotation means for absorbing heat from the polarization rotation means.

2. The apparatus of claim 1, wherein the cooling means comprises a heat-conductive material covering substantially the entire second side of the polarization rotation means.

3. The apparatus of claim 2, wherein the cooling means further comprises a cooling manifold containing one or more cooling passages formed in the heat-conductive material, a cooling fluid passing through the cooling manifold, and pump means to circulate the cooling fluid through the cooling manifold.

4. The reflective apparatus of claim 2, the heat-conductive material being copper.

5. The apparatus of claim 1, wherein the cooling means comprises one or more heat fins attached to the second side of the polarization rotation means.

6. An apparatus comprising:
polarization rotation means for 1) rotating the polarization of polarized incident optical energy in the presence of a substantially uniform magnetic field to produce a first optical energy with a polarization which is rotated through an angle with respect to the polarization of the polarized incident optical energy, 2) reflecting the first optical energy, and 3) further rotating the polarization of the reflected first optical energy in the presence of the magnetic field to produce a second optical energy with a polarization which is further rotated through the angle with respect to the polarization of the first optical energy, the polarization rotation means producing a total rotation of the second optical energy relative to the incident optical energy greater than the angle, the polarization rotation means having a first side for receiving and transmitting incident optical energy, and a second side opposite the first side for reflecting the first optical energy;

magnet means positioned adjacent and coaxially along an axis with the polarization rotation means for producing a constant, substantially uniform magnetic field in a fixed direction at the first side of the polarization rotation means;

first and second pole pieces, positioned coaxially on the axis on opposite sides of the polarization rotation means and the magnet means, for substantially confining the magnetic field to the polarization rotation means; and cooling means coaxial with the polarization rotation means for absorbing heat from the polarization rotation means.

7. The apparatus of claim 6, wherein the cooling means comprises a heat-conductive material covering substantially the entire second side of the polarization rotation means, the thermal conductivity of the heat-conductive material being relatively greater than the thermal conductivity of the polarization rotation means.

8. The apparatus of claim 7, the cooling means further comprising a cooling manifold containing one or more cooling passages formed in the heat-conductive material, a cooling fluid passing through the cooling manifold, and pump means to circulate the cooling fluid through the cooling manifold.

9. The reflective apparatus of claim 7, the heat-conductive material being copper.

10. The apparatus of claim 6, wherein the cooling means comprises one or more heat fins attached to the second side of the polarization rotation means.

11. An apparatus comprising:
means for polarizing optical energy to provide an incident polarized optical energy;
polarization rotation means for 1) rotating the polarization of the polarized incident optical energy in the presence of a substantially uniform magnetic field to produce a first optical energy with a polarization which is rotated through a first angle with respect to the polarization of thé polarized incident optical energy, 2) reflecting the first optical energy, and 3) further rotating the polarization of the reflected first optical energy in the presence of the magnetic field to produce a second optical energy with a polarization which is further rotated through a second angle with respect to the polarization of the first optical energy, the polarization rotation means producing a total rotation of the second optical energy relative to the incident optical energy greater than the first angle, the polarization rotation means having a first side for receiving and transmitting incident optical energy, and a second side opposite the first side for reflecting the first optical energy, the first and second angles being respectively proportional to the strength of the magnetic field at the first and second sides;

magnet means positioned adjacent and coaxially along an axis with the polarization rotation means for producing a constant magnetic field in a fixed direction that is substantially uniform at each point on the first side of the polarization rotation means and substantially uniform at each point on the second side of the polarization rotation means; and cooling means coaxial with the polarization rotation means for absorbing heat from the polarization rotation means.

12. The apparatus of claim 11, wherein the cooling means comprises a heat-conductive material covering substantially the entire second side of the polarization rotation means, the thermal conductivity of the heat-conductive material being relatively greater than the thermal conductivity of the polarization rotation means.

13. The apparatus of claim 12, the cooling means further comprising a cooling manifold containing one or more cooling passages formed in the heat-conductive material, a cooling fluid passing through the cooling manifold, and pump means to circulate the cooling fluid through the cooling manifold.

14. The reflective apparatus of claim 12, the heat-conductive material being copper.

15. The apparatus of claim 11, wherein the cooling means comprises one or more heat fins attached to the second side of the polarization rotation means.

16. An apparatus comprising:
- a rotator medium which rotates the polarization of polarized optical energy passing therethrough, the medium having a first side on which optical energy impinges and an opposite second side;
- a thermally conductive reflector having a reflective first surface, the reflector being positioned in face-to-face juxtaposition with and contacting the second side of the rotator medium to conduct heat away from the rotator medium;
- a thermal conductor positioned in juxtaposition with and contacting the reflector to a side of the reflector opposite the rotator medium to conduct heat passing through the reflector from the rotator medium away from the reflector, and thermal conductor being positioned immediately opposite the rotator medium;
- a permanent magnet for producing a constant magnetic field in a fixed direction; and
- a magnetic pole piece in the vicinity of the thermal conductor and the permanent magnet for rendering the constant magnetic field substantially uniform throughout the rotator medium.

17. The apparatus of claim 16 wherein the thermal conductor and the magnetic pole piece are formed from a single piece of material, the material being both thermally conductive and magnetically permeable.

* * * * *